United States Patent
Ishii et al.

(10) Patent No.: US 10,377,335 B2
(45) Date of Patent: Aug. 13, 2019

(54) STEERING WHEEL

(71) Applicant: TOYODA GOSEI CO., LTD., Kiyosu-shi, Aichi-ken (JP)

(72) Inventors: Tsutomu Ishii, Kiyosu (JP); Toshihito Yanagisawa, Kiyosu (JP); Yoshiteru Banno, Kiyosu (JP); Yoshitomo Kato, Kiyosu (JP); Akira Yamashita, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 102 days.

(21) Appl. No.: 15/797,653

(22) Filed: Oct. 30, 2017

(65) Prior Publication Data

US 2018/0134243 A1 May 17, 2018

(30) Foreign Application Priority Data

Nov. 15, 2016 (JP) ................. 2016-222380

(51) Int. Cl.
*B60R 21/01* (2006.01)
*B60R 21/203* (2006.01)

(52) U.S. Cl.
CPC .......... *B60R 21/2035* (2013.01); *B60R 21/01* (2013.01); *B60R 2021/01122* (2013.01)

(58) Field of Classification Search
CPC ............... B60R 21/2035; B60R 21/01; B60R 2021/01122
See application file for complete search history.

(56) References Cited

U.S. PATENT DOCUMENTS

| | | | | |
|---|---|---|---|---|
| 5,836,608 | A * | 11/1998 | Soderquist | B60R 21/217 280/728.2 |
| 6,592,141 | B1 * | 7/2003 | Dancasius | B60R 21/2037 280/728.1 |
| 9,120,453 | B2 * | 9/2015 | Obayashi | B62D 7/222 |
| 9,195,257 | B2 * | 11/2015 | Miyahara | B60R 21/2037 |
| 2006/0061068 | A1 * | 3/2006 | Nash | B60R 21/2037 280/728.2 |
| 2009/0218739 | A1 * | 9/2009 | Terada | B60R 21/2037 267/2 |
| 2013/0069350 | A1 | 3/2013 | Umemura et al. | |
| 2016/0031480 | A1 | 2/2016 | Ishii et al. | |
| 2017/0088171 | A1 | 3/2017 | Ishii et al. | |

FOREIGN PATENT DOCUMENTS

JP 2016-030552 A 3/2016

* cited by examiner

*Primary Examiner* — Drew J Brown
(74) *Attorney, Agent, or Firm* — Posz Law Group, PLC

(57) ABSTRACT

A steering wheel includes a metal core earthed to a body of a vehicle, an airbag device, an insulator, and a connector. The airbag device includes a bag holder supported by the metal core, wherein the bag holder forms part of a positive electric path connected to a horn device, an airbag coupled to the bag holder by a fastener, and an inflator including a circumferential portion that forms a flange, wherein the flange of the inflator is coupled by the fastener to the bag holder. The insulator insulates the bag holder from at least the flange and the fastener among elements of the airbag device. The connector electrically connects at least the flange, among the flange and the fastener, to the metal core.

6 Claims, 7 Drawing Sheets

STEERING WHEEL

BACKGROUND OF THE INVENTION

The present invention relates to a steering wheel including an airbag device.

One type of a steering wheel for an automobile includes a core, an airbag device, and a horn switch mechanism (for example, refer to Japanese Laid-Open Patent Publication No. 2016-30552). As shown in FIG. 13, the above-described steering wheel 114 includes a metal core 101 that is earthed to the body of the automobile.

An airbag device 102 includes a bag holder 103, an airbag 106, and an inflator 109. The bag holder 103 is supported by a horn switch mechanism 113 on the metal core 101. The bag holder 103 forms part of a positive electric path 104 that is connected to a horn device 105.

The airbag 106 includes an opening 107. A ring retainer 108 including a bolt 111 is arranged inside the airbag 106. A portion of the airbag 106 surrounding the opening 107 is located between the ring retainer 108 and the bag holder 103. A circumferential portion of the inflator 109 includes a flange 109a. The flange 109a and the airbag 106 are located at opposite sides of the bag holder 103. The bolt 111 of the ring retainer 108 inserted through the portion of the airbag 106 surrounding the opening 107, the bag holder 103, and the flange 109a. A nut 112 is then fastened to the bolt 111. The ring retainer 108 presses the portion of the airbag 106 surrounding the opening 107 against the bag holder 103. Further, the flange 109a is pressed against the bag holder 103.

The horn switch mechanism 113 extends between the bag holder 103 and the metal core 101. The horn switch mechanism 113 pushes the airbag device 102 and electrically connects the bag holder 103 and the metal core 101 to activate the horn device 105.

In the conventional steering wheel 114, the airbag 106 generates static electricity when rubbed. The static electricity is temporarily accumulated in the inflator 109. When the airbag device 102 is pressed thereby electrically connecting the bag holder 103 and the metal core 101, the static electricity is released from the automobile body through the flange 109a, the bag holder 103, the horn switch mechanism 113, and the metal core 101.

The method for connecting the inflator 109 to ground differs between automobile manufacturers. One manufacturer may release the static electricity by connecting the inflator 109 to the positive electric path 104, and another manufacturer may release the static electricity without connecting the inflator 109 to the positive electric path 104.

SUMMARY OF THE INVENTION

It is an object of the present invention to provide a steering wheel that releases static electricity from an inflator without connecting the inflator to a positive electric path.

To achieve the above object, one aspect of the present invention is a steering wheel including a metal core, an airbag device, and insulator, and a connector. The metal core is earthed to a body of a vehicle. The airbag device includes a bag holder, an airbag, and an inflator. The bag holder is supported by the metal core. Further, the bag holder forms part of a positive electric path connected to a horn device. The airbag is coupled to the bag holder by a fastener. The inflator includes a circumferential portion that forms a flange. The flange of the inflator is coupled by the fastener to the bag holder. The insulator insulates the bay holder from at least the flange and the fastener among elements of the airbag device. The connector electrically connects at least the flange, among the flange and the fastener, to the metal core.

With this structure, the bag holder that forms part of the positive electric path is insulated by the insulator from at least the flange of the inflator and the fastener among the elements of the airbag device. This electrically isolates the inflator and the fastener from the bag holder. Further, the connector electrically connects at least the flange, among the flange and the fastener, to the metal core, which is earthed to the body of the vehicle. Thus, when rubbing or the like of the airbag generates static electricity, the flange of the inflator, the fastener, and the metal core release the static electricity to the body of the vehicle. In this manner, static electricity is released from the inflator without the inflator being connected to the positive electric path.

Preferably, a portion of the airbag surrounding an opening, the bag holder, and the flange each include an insertion hole. The fastener includes a bolt inserted through the insertion hole of each of the airbag, the bag holder, and the flange. The insulator includes a first insulation portion located between the bag holder and the flange and a second insulation portion located between the bolt and a wall surface of the insertion hole in the bag holder.

With this structure, the first insulation portion, which is located between the bag holder and the flange, insulates the bag holder from the flange. The second insulation portion, which is located between the bolt and the wall surface of the insertion hole in the bag holder, insulates the bag holder from the bolt in this manner, the insulator insulates the bag holder from the flange and the fastener, among the elements of the airbag device.

Preferably, the steering wheel further includes a ring retainer located in the airbag at a side opposite to the flange relative to the bag holder. The fastener presses the ring retainer toward the bag holder to couple the portion or the airbag surrounding the opening to the bag holder. The insulator further includes a third insulation portion located between the bag holder and the portion of the airbag surrounding the opening.

With this structure, when the fastener presses the ring retainer toward the bag holder, the portion of the airbag surrounding the opening to the bag holder is held between the ring retainer and the third insulation portion. In this manner, the airbag is coupled to the bag holder at the portion surrounding the opening. Further, the third insulation portion insulates the bag holder from the ring retainer.

Preferably, the first insulation portion, the second insulation portion, and the third insulation portion are formed integrally from the same resin material.

With this structure, the second insulation portion, which is located in the insertion hole of the bag holder, connects the first insulation portion, which is located at the flange side of the bag holder, and the third insulation portion, which is located at the ring retainer side (airbag side) of the bag holder. The insulator, which includes the first insulation portion, the second insulation portion, and the third insulation portion, is attached to and integrated with the bag holder. This facilitates the manufacturing of bag holder, to which the insulator is attached, compared to when the bag holder and the insulator are separately formed and subsequently coupled to each other.

The bag holder, which is integrated with the insulator, can be formed through, for example, insert molding. In this case, the bag holder is arranged in a mold as an insert, and the mold is filled with molten resin. When the resin hardens, the insulator is attached to the bag holder with the bag holder held between the first insulation portion and the third insulation portion at opposite sides in the thickness-wise direction. Further, the second insulation portion in the insertion hole of the bag holder connects the first insulation portion and the third insulation portion.

Preferably, the ring retainer includes a looped retaining portion that presses the portion of the airbag surrounding the opening toward the bag holder. The bag holder includes a looped portion. The portion of the airbag surrounding the opening is pressed toward the looped portion of the bag holder by the retaining portion. The third insulation portion is arranged on the bag holder at a location including at least the looped portion.

With this structure, when the fastener is tightened, the looped retaining portion of the ring retainer is pressed toward the bag holder together with the portion of the airbag surrounding the opening of the airbag. The portion surrounding the opening is pressed against the third insulation portion of the insulator.

If the third insulation portion were to be arranged only around the insertion hole of the bag holder, the portion surrounding the opening would be coupled to the bag holder only at a location contacting the third insulation portion (only at portion around insertion hole). Locations around the portion surrounding the opening distant from the insertion hole would not be pressed by the retaining portion of the ring retainer and would not be coupled to the bag holder. Thus, when the airbag is deployed and inflated toward the rear, stress will be concentrated and applied to the location where the portion of the bag holder 31 surrounding the opening 33$a$ is coupled (portion around insertion hole).

In the above structure, the third insulation portion is arranged on the looped portion of the bag holder, which is where the retaining portion is pressed against the portion surrounding the opening. This increases the area of the portion surrounding the opening that contacts the third insulation portion. The entire portion surrounding the opening is pressed against the third insulation portion and coupled to the bag holder. Thus, deployment and inflation of the airbag applies stress in a dispersed state to the portion surrounding the opening.

Preferably, the bag holder includes a looped portion. The flange is pressed toward the looped portion of the bag holder. The first insulation portion is arranged on the bag holder at a location including at least the looped portion.

With this structure, the flange of the inflator is pressed toward the bag holder. The flange is pressed against the first insulation portion of the insulator.

If the first insulation portion were to be arranged only around the insertion hole of the bag holder, there would be locations between the bag holder and the flange where the first insulation portion is not arranged. Gaps would be formed at such locations between the bag holder and the flange. Thus, when activation of the inflator generates gas to deploy and inflate the airbag, some of the gas may leak out of the airbag through the gap.

In the above structure, the first insulation portion is arranged on the looped portion of the bag holder, which is where the flange is pressed against. Thus, the formation of a gap is limited between the bag holder and the flange. Accordingly, gas leakage from the airbag is limited.

The above-described steering wheel releases static electricity from an inflator without connecting the inflator to a positive electric path.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a steering wheel for an automobile will now be described with reference to FIGS. 1 to 11.

Figure 1:
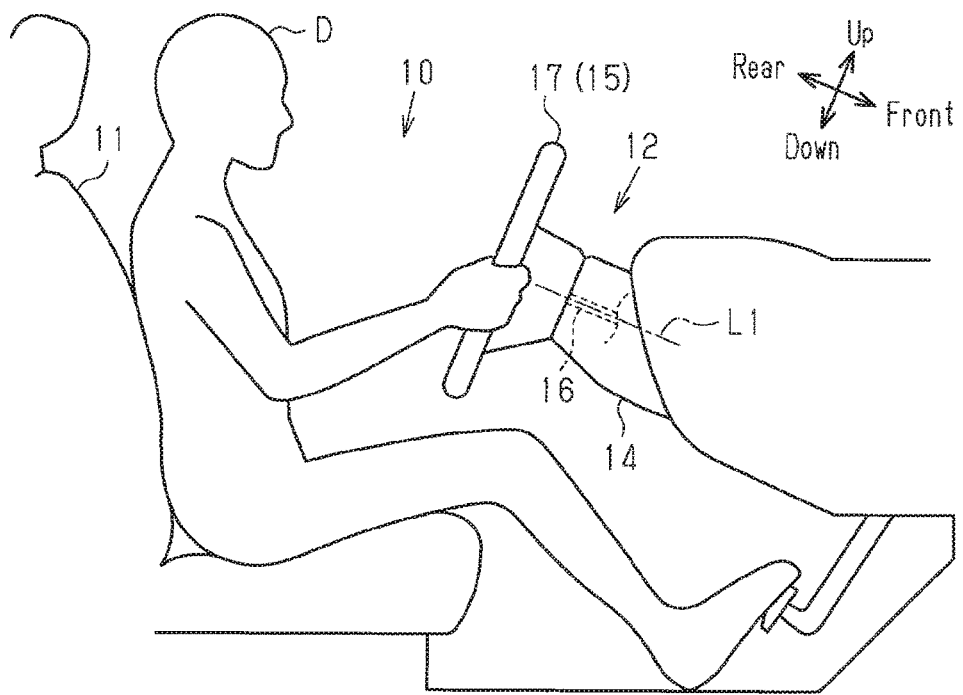
FIG. 1 is a schematic side view showing one embodiment of a steering wheel arranged in an automobile.

As shown in FIG. 1, a steering device 12, which is operated by a driver D when steering an automobile 10, is arranged in front of a driver seat 11 in the automobile 10. The steering device 12 includes a steering column. 14 and a rotatable steering wheel 15 located toward the rear from the steering column 14. A steering gearbox (not shown) is arranged in the steering column 14 to transmit the rotation of the steering wheel 15 to a steering shaft 16. The steering shaft 16 is tilted to be higher toward the rear.

The axis L1 of the steering shaft 16 will be used as a frame of reference in the description of the steering wheel 15. The direction extending along the axis L1 will be referred to as the front-rear direction of the steering wheel 15. Among the directions extending along planes that are orthogonal to the axis L1, the direction extending along the steering wheel 15 will be referred to as the up-down direction. Accordingly, the front-rear direction of the steering wheel 15 is slightly inclined relative to the front-rear direction (horizontal direction) of the automobile 10, and the up-down direction of the steering wheel 15 is slightly inclined relative to the up-down direction (vertical direction) of the automobile 10.

In FIGS. 3 to 5 and 10 to 11, to simplify the description, the front-rear direction of the steering wheel 15 corresponds to the horizontal direction, and the up-down direction of the steering wheel 15 corresponds to the vertical direction. The same applies to FIG. 12 that shows a modified example of an insulator 51 and FIG. 13 that shows the prior art.

Figure 2:
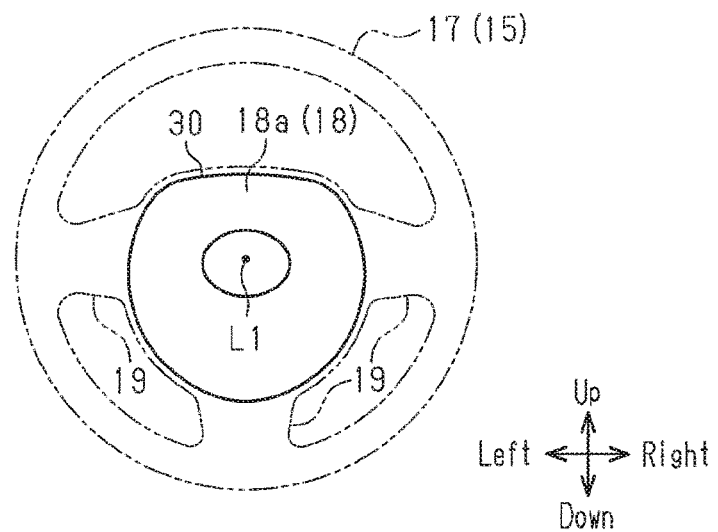
FIG. 2 is a front view of the steering wheel.

As shown in FIG. 2, the steering wheel 15 includes a ring 17 (also referred to as grip or rim), a pad 18, and spokes 19. The ring 17 is the portion held and rotated by the driver D. Further, the ring 17 is circular and extends around the axis L1. The pad 18 is encircled by the ring 17. The spokes 19 extend between the ring 17 and the pad 18. The central portion of the steering wheel 15 includes an airbag device 30 (airbag module). The pad 18 forms part of the airbag device 30.

Figure 3:
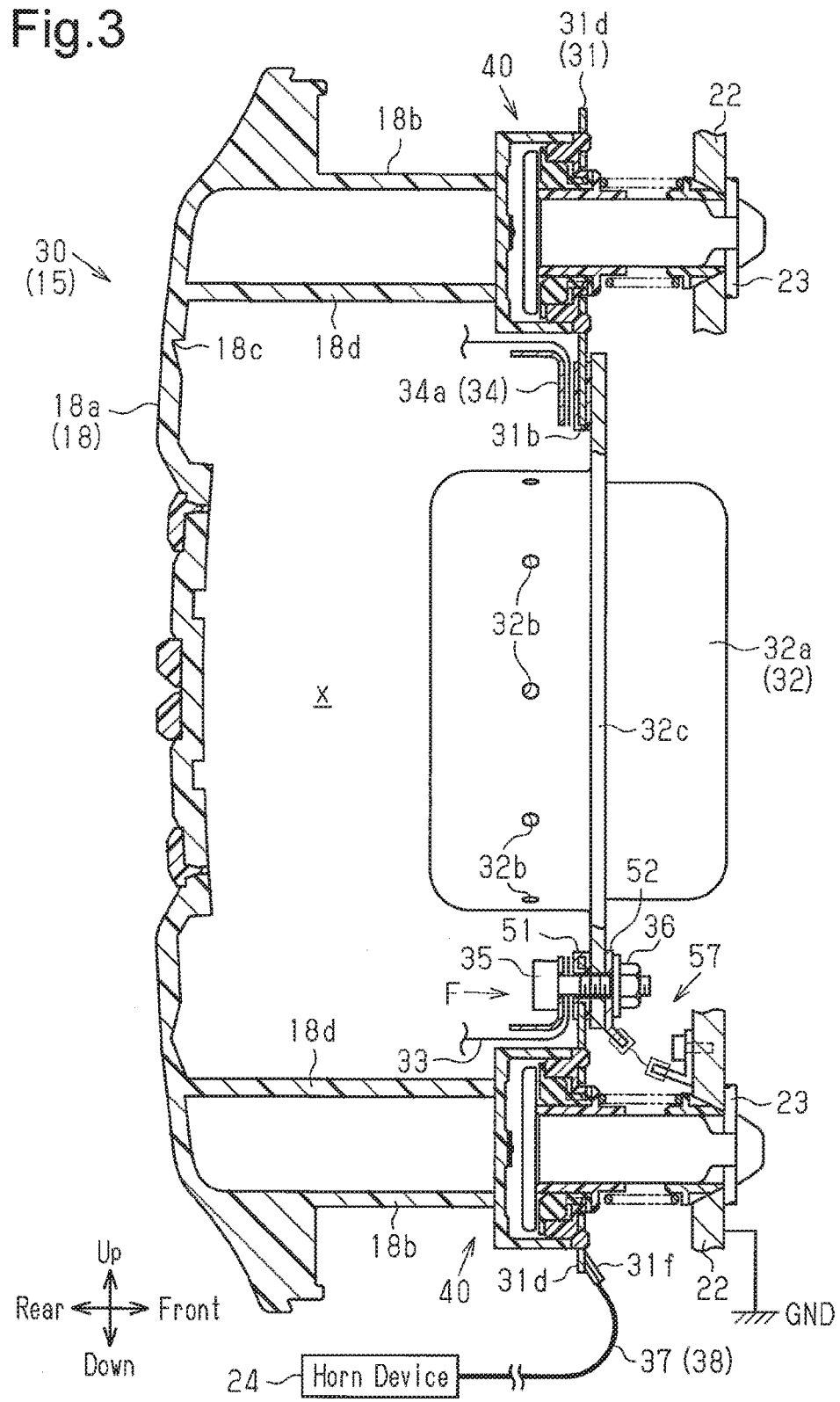
FIG. 3 is a cross-sectional view showing an airbag device in the steering wheel.

Referring to FIG. 3, the frame of the steering wheel 15 is formed by a metal core 22. The metal core 22 is formed from iron, aluminum, magnesium, or an alloy of these metals. The metal core 22 is earthed to the body of the automobile 10 (i.e., connected to ground (GND)). Further, the metal core 22 is mounted on and rotated integrally with an upper end of the steering shaft 16.

Figure 4:
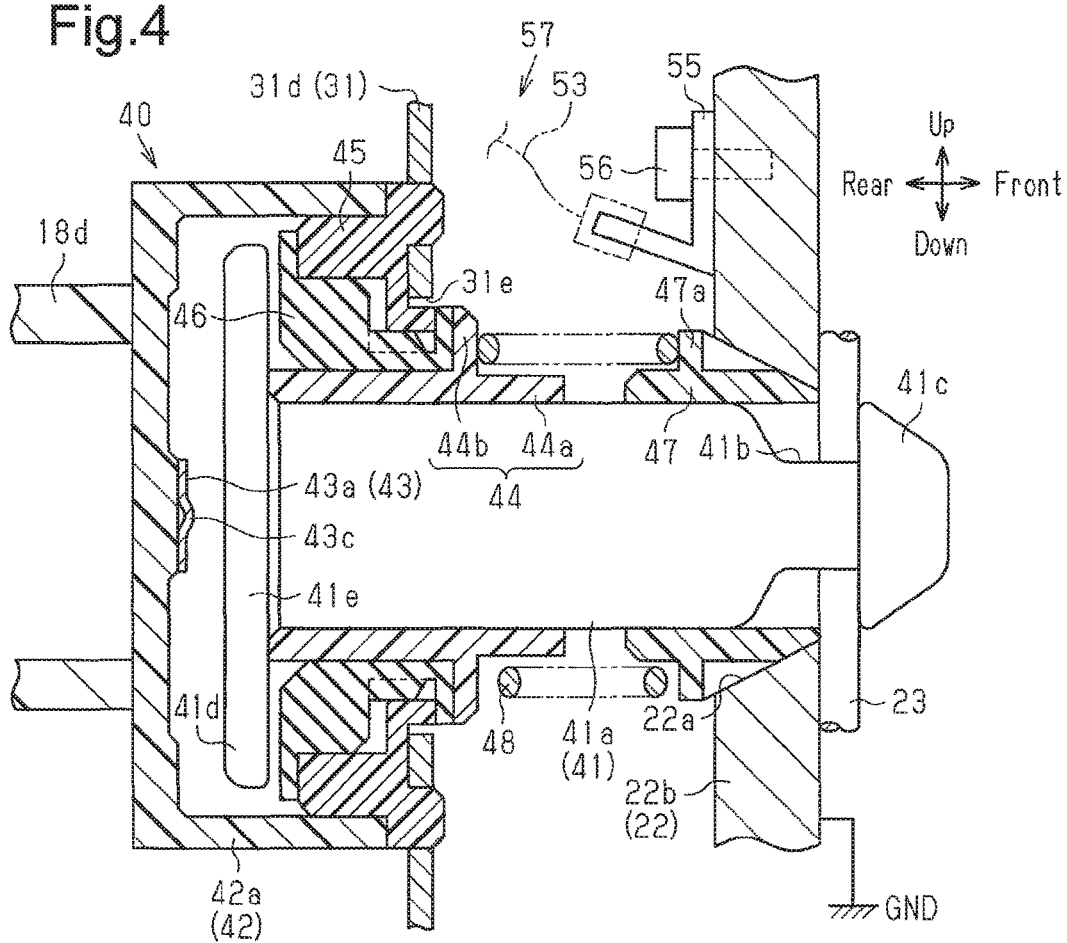
FIG. 4 is an enlarged cross-sectional view of a horn switch mechanism shown in FIG. 3.
Figure 5:
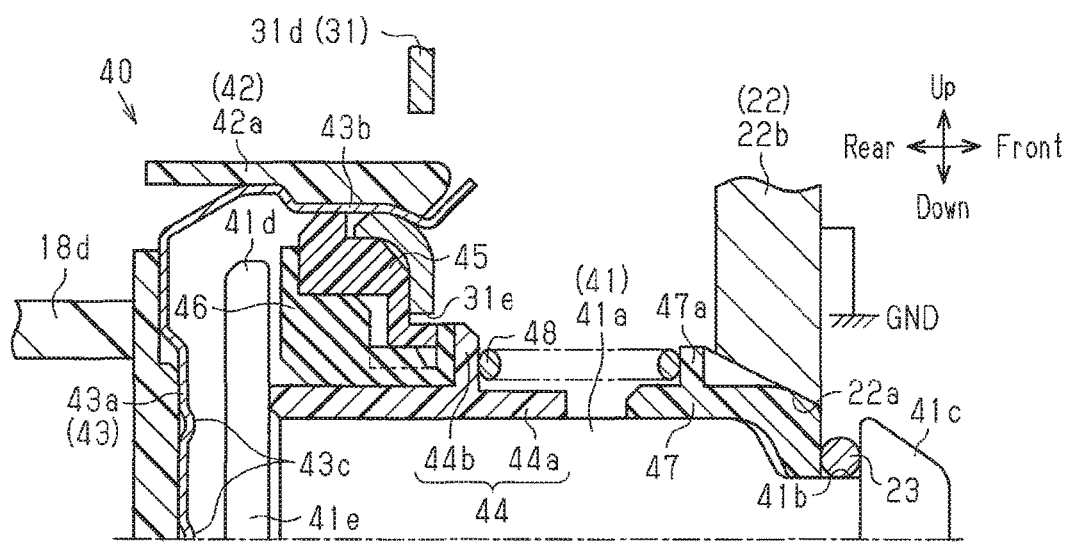
FIG. 5 is a cross-sectional view of the horn switch mechanism showing a cross section that differs from that of FIG. 4.

As shown in FIGS. 3 to 5, the metal core 22 includes seats 22b arranged around the steering shaft 16. A through hole 22a extends through each seat 22b. A clip 23 is arranged at the front side of each seat 22b. The clip 23 is formed by bending a wire of a conductive metal such as spring steel into a predetermined shape. Each clip 23 includes a portion that is in contact with a front surface of the metal core 22 and a portion that is located in front of the through hole 22a.

The automobile 10 includes a horn device 24. Horn switch mechanisms 40 are used to activate the horn device 24 when the airbag device 30 is pressed. The number of horn switch mechanisms 40 is the same as the number of the through holes 22a. The horn switch mechanisms 40 have the same structure. Each horn switch mechanism 40 is snap-fitted to the metal core 22 on the corresponding seat 22b. The airbag device 30 is supported by the horn switch mechanisms 40 on the metal core 22. In this manner, each horn switch mechanism 40 functions as a support for the airbag device 30 and as a switch for the horn device 24. Further, each horn switch mechanism 40 uses the airbag device 30 to function to reduce, or dampen, the vibration of the steering wheel 15.

The airbag device 30 and the horn switch mechanisms 40 will now be described.

Airbag Device 30

As shown in FIG. 3, in addition to the pad 18, the airbag device 30 includes a bag holder 31, an inflator 32, an airbag 33, a ring retainer 34, and fasteners F.

The pad 18 includes a cover 18a and an accommodation wall 18b. The cover 18a forms an ornamental surface on the rear side of the pad 18. The accommodation wall 18b is located at the front side of the cover 18a. The cover 18a, the accommodation wall 18b, and the bag holder 31 cooperate to enclose an open space defining a bag accommodation compartment x that mainly accommodates the airbag 33. The portion of the cover 18a forming the bag accommodation compartment x is a thin portion 18c that tears open when the airbag 33 is deployed and inflated.

Switch supports 18d are formed on the pad 18 to support the horn switch mechanisms 40. Each switch support 18d extends toward the front from the cover 18a of the pad 18 and is formed integrally with the accommodation wall 18b.

Figure 6:
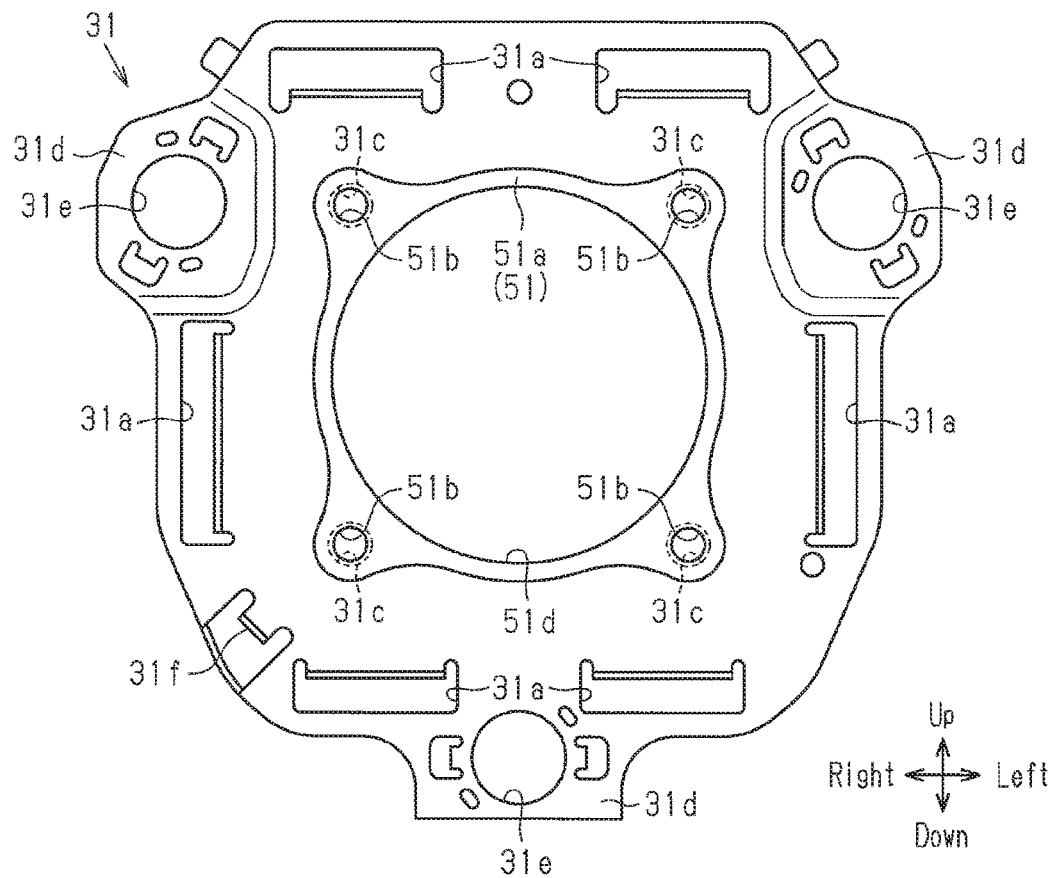
FIG. 6 is a rear view of a bag holder in the embodiment.
Figure 10:
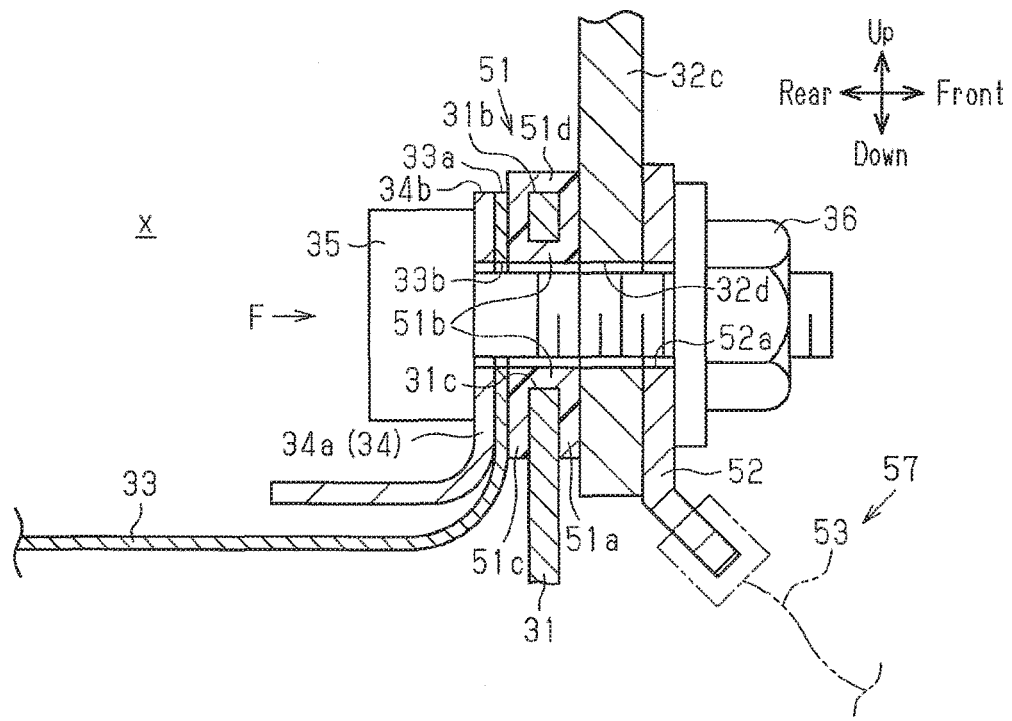
FIG. 10 is an enlarged cross-sectional view showing part of FIG. 3 in a state in which an insulator is insulating the bag holder from a flange of the inflator and a fastener.

Referring to FIGS. 3, 6, and 10, the bag holder 31 is formed by pressing a conductive metal plate. The bag holder 31 is supported by the horn switch mechanisms 40 on the metal core 22. The bag holder 31 will be described in detail later.

The peripheral portion of the bag holder 31 includes slit-like engagement holes 31a. The front end of the accommodation wall 18b includes engagement tongues (not shown) that are inserted through and engaged with the engagement holes 31a. The central portion of the bag holder 31 includes a circular opening 31b. The bag holder 31 includes insertion holes 31c located around the opening 31b. The inflator 32 and the airbag 33 are attached to the bag holder 31.

Figure 7:
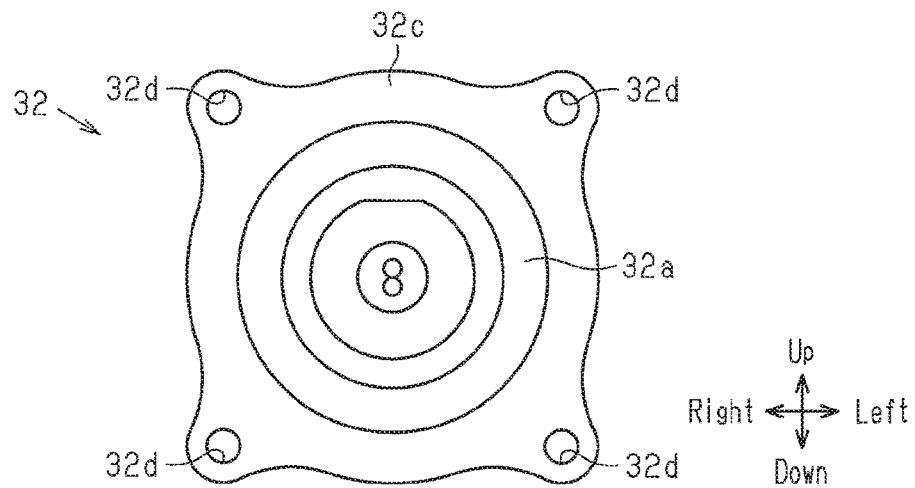
FIG. 7 is a rear view of an inflator in the embodiment.

In further detail, referring to FIGS. 3 and 7, the shell of the inflator 32 is formed by a case 32a. The case 32a contains a gas generator propellant (not shown) to deploy and inflate the airbag 33. The cylindrical circumferential wall of the case 32a includes a plurality of gas election holes 32b. A flange 32c located toward the front from the gas ejection holes 32b extends from the circumferential wall of the case 32a. The flange 32c includes insertion holes 32d located in front of the insertion holes 31c of the bag holder 31.

The inflator 32 is inserted into the opening 31b of the bag holder 31 from the front side so that the portion of the case 32a rearward from the flange 32c extends into the bag accommodation compartment x. The flange 32c is located at the front side of the portion surrounding the opening 31b.

Referring to FIGS. 3 and 10, the airbag 33 is formed from a flexible fabric having high strength such as a woven fabric. The front portion of the airbag 33 includes an opening 33a. Most of the airbag 33 excluding at least the portion surrounding the opening 33a is folded in a deployable and inflatable manner. The portion of the airbag 33 surrounding the opening 33a is located at the rear side of the portion of the bag holder 31 surrounding the opening 31b. The airbag 33 includes insertion holes 33b located around the opening 33a at the rear side of the insertion holes 31c of the bag holder 31.

Figure 9:
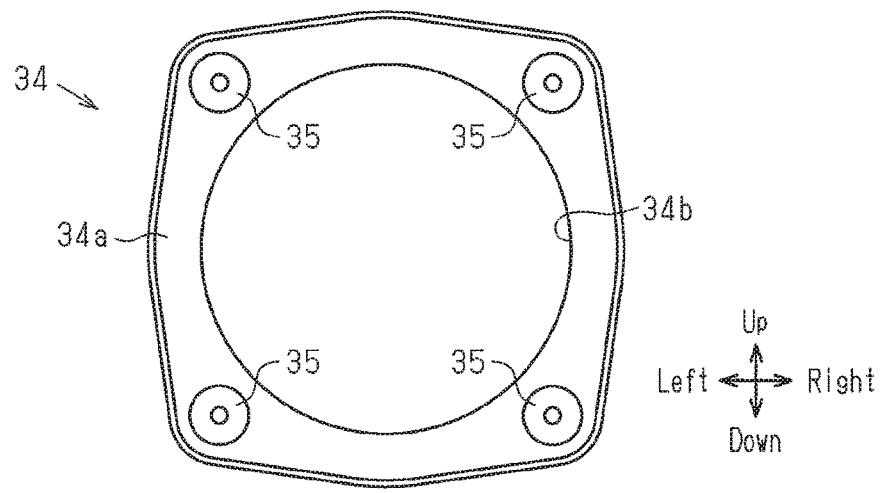
FIG. 9 is a front view of a ring retainer in the embodiment.

The ring retainer 34 is used to couple the portion of the airbag 33 surrounding the opening 33a to the bag holder 31. As shown in FIGS. 9 and 10, the front end of the ring retainer 34 defines a retaining portion 34a. The retaining portion 34a is looped and includes an opening 34b. The opening 34b extends through the central part of the retaining portion 34a and has a circular shape conforming to the opening 31b of the bag holder 31. The ring retainer 34 is arranged in the airbag 33 so that the retaining portion 34a is located at the rear side of the portion surrounding the opening 33a. The retaining portion 34a includes bolts 35, each forming part of a fastener F, at locations rearward from the insertion holes 31c of the bag holder 31.

The bolts 35 of the ring retainer 34 are inserted from the rear into the insertion hole 33b of the airbag 33, the insertion hole 31c of the bag holder 31, and the insertion hole 32d of the inflator 32. Nuts 36 are tightened from the front side to the inserted bolts 35. The nuts 36 form the fasteners F together with the bolts 35. The fastening of the fasteners F couples the airbag 33 to the bag holder 31 with the ring retainer 34. In further detail, the fasteners F press the ring retainer 34 toward the bag holder 31 so that the portion of the airbag 33 surrounding the opening 33a is held between the retaining portion 34a of the ring retainer 34 and the bag holder 31. The portion of the airbag 33 surrounding the opening 33a is coupled to the bag holder 31 in this manner. The fastening of the fasteners F also couples the flange 32c of the inflator 32 to the bag holder 31.

Figure 8:
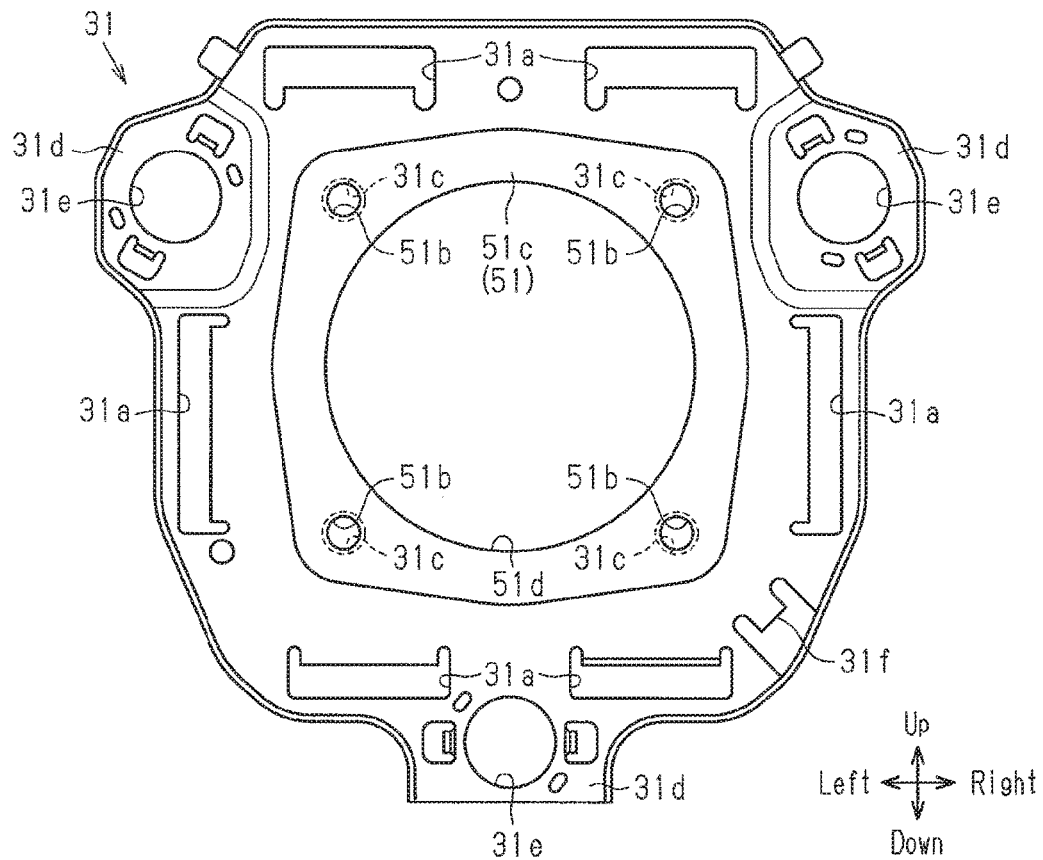
FIG. 8 is a front view of the bag holder.

As shown in FIGS. 4 and 8, the peripheral portion of the bag holder 31 includes coupling portions 31d used to couple the horn switch mechanisms 40. The coupling portions 31d are located frontward from the switch supports 18d of the pad 18 (refer to FIG. 3). Each coupling portion 31d includes a circular coupling hole 31e.

Referring to FIG. 3, a battery (not shown) installed in the automobile 10 is connected to a positive electric path 38 and a negative electric path. The positive electric path 38 is connected to the horn device 24. Part of the positive electric path 38 is formed by the bag holder 31. The bag holder 31 includes a portion that is cut out and bent to form a connected portion 31*f*. Another part of the positive electric path 38 is formed by a wiring harness 37 that is connected to the connected portion 31*f*. A further part of the positive electric path 38 is formed by a spiral cable (not shown) connecting the wiring harness 37 and the horn device 24.

Horn Switch Mechanisms 40

As shown in FIGS. 4 and 5, each horn switch mechanism 40 includes a snap pin 41, a contact holder 42, a movable contact 43, a pin holder 44, a damper holder 45, an elastic member 46, an auxiliary support 47, and an urging member. Each element of the horn switch mechanisms 40 will now be briefly described.

The snap pin 41 is formed from a conductive metal material. The snap pin 41 includes a shank 41*a* extending in the front-rear direction. The shank 41*a* of the snap pin 41 is inserted through the coupling hole 31*e* of the bag holder 31. A looped engagement groove 41*b* is formed at a location slightly separated toward the rear from the front end surface of the shank 41*a*. The portion of the snap pin 41 between the front end surface and the engagement groove 41*b* forms a support 41*c* of the snap pin 41. A flange 41*d* is formed on the circumferential portion of the rear end of the shank 41*a*. The rear end of the snap pin 41, that is, the rear end and flange 11*d* of the shank 41*a* form a fixed contact 41*e*.

The contact holder 42 is formed from an insulative resin material. The contact holder 42 includes a cylindrical circumferential wall 42*a* having a closed rear end and covering the rear portion of the snap pin 41 including the flange 41*d*.

The movable contact 43 is formed by pressing a strip of spring steel that is conductive. The movable contact 43 includes a main body 43*a*, which extends in the radial direct on of the circumferential wall 12*a* of the contact holder 42, and two side portions 43*b*, which extend toward the front from opposite sides of the main body 43*a*. The main body 43*a* includes contact projections 43*c* projecting toward the front and arranged next to one another in the longitudinal direction of the main body 43*a*. Each side portion 43*b* is engaged with the inner surface of the circumferential wall 42*a* to attach the movable contact 43 to the contact holder 42. Further, each side portion 43*b* is in contact with the bag holder 31 to electrically connect the movable contact 43 to the bag holder 31.

The pin holder 44 is formed from an insulative resin material. A major portion of the in holder 44 formed by a sleeve 44*a* having open front and rear ends. The sleeve 44*a* is fitted to the shank 41*a* of the snap pin 41 and slidable in the front-rear direction. A looped collar 44*b* is formed on the circumference of the sleeve 44*a*. The rear portion of the holder 44 is covered by the contact holder 42.

The damper holder 45 is formed from an insulative resin material. The damper holder 45 is coupled to the contact holder 42 in a state covering part of the pin holder 44. The damper holder 45 is covered by the contact holder 42.

The elastic member 46 is looped and formed from an elastic material such as rubber (e.g., EPDMI or silicone rubber) or an elastomer. The elastic member 46 is located between the pin holder 44 and the damper holder 45. The elastic member 46 is covered by the contact holder 42. The elastic member 46 is used as a spring for a dynamic damper. The size (dimensions in radial direction, front-rear direction, etc.) of the elastic member 46 is adjusted so that the resonant frequency of the dynamic damper in the up-down direction and lateral direction is set to a target control frequency for vibration, or intended control frequency of vibration, of the steering wheel 15 in the up-down direction and lateral direction.

The auxiliary support 47 is formed by an insulative resin material. The auxiliary support 47 includes a looped collar 47*a* The auxiliary support 47 is fitted on the snap pin 41 in a non-separable manner.

The urging member is formed by a coil spring 48. In detail, the urging member is formed by the portion of the coil spring 48 wound around the shank 41*a* of the snap pin 41, the part of the sleeve 44*a* of the pin holder 44 located frontward from the collar 44*b*, and the part of the auxiliary support 47 located rearward from the collar 47*a*. The coil spring 48, which is arranged in a compressed state between the two collars 44*b* and 47*a*, urges the pin holder 44 toward the rear and urges the auxiliary support 47 toward the front.

In this manner, single components, namely, the snap pin 41, the contact holder 42, the movable contact 43, the pin holder 44, the damper holder 45, the elastic member 46, the auxiliary support 47, and the coil spring 48 form a unit that serves as the assembly of each horn switch mechanism 40. Thus, when coupling or replacing the horn switch mechanism 40, the horn switch mechanism 40 can be handled as a single unit.

The airbag device 30 is coupled by the horn switch mechanisms 40 to the metal core 22. When coupling the airbag device 30, the snap pin 41 of each horn switch mechanism 40 is inserted into the through hole 22*a* of the corresponding seat 22*b* of the metal core 22 from the rear. During the inserting process, the support 41*c* and the auxiliary support 47, which is urged toward the front by the coil spring 4$, hold the portion of the clip 23 located frontward from the through hole 22*a* at the front and rear sides. The structure that engages the snap pin 41 with the metal core 22 using the elasticity of the clip 23 when inserted into the through hole 22*a* is referred to as a snap-fit structure.

As shown in FIG. 10, the structure of the present embodiment further includes an insulator 51 that insulates the bag holder 31 from, among the elements of the airbag device 30, at least the flange 32*c* and the fasteners F. The insulator 51 includes a first insulation portion 51*a*, a plurality of second insulation portions 51*b*, a third insulation portion 51*c* and a fourth insulation portion 51*d*. The first to fourth insulation portions 51*a* to 51*d* are formed integrally from the same resin material.

Referring to FIGS. 6, 7, and 10, the first insulation portion 51*a* is located between the bag holder 31 and the flange 32*c* of the inflator 32. The bag holder 31 includes a looped portion. The flange 32*c* is pressed toward the looped portion of the bag holder 31. The first insulation portion 51*a* is arranged on the looped portion of the bag holder 31. Each second insulation portion 51*b* is located between the shank of the corresponding bolt 35 and the wall surface of the corresponding insertion hole 31*c* in the bag holder 31. The second insulation portion 51*b* is tubular and has front and rear ends that are both open. As shown in FIGS. 8 to 10, the third insulation portion 51*c* is located between the bag holder 31 and the portion of the airbag 33 surrounding the opening 33*a*. The bag holder 31 includes a looped portion. The portion of the airbag 33 surrounding the opening 33*a* is pressed by the retaining portion 34*a* of the ring retainer 34 toward the looped portion of the bag holder 31. The third insulation portion 51*c* is arranged on the looped portion of the bag holder 31. The fourth insulation portion 51*d* is arranged along the wall surface of the opening 31*b* of the bag holder 31. The fourth insulation portion 51d is tubular and has front and rear ends that are both open. The second insulation portions 51b are located in the insertion holes 31c and connected to the first insulation portion 51a and the third insulation portion 51c. Further, the fourth insulation portion 51d is located in the opening 31b and connected to the first insulation portion 51a and the third insulation portion 51c.

With such a structure, the insulator 51, which includes the first insulation portion 51a, the second insulation portions 51b, the third insulation portion 51c, and the fourth insulation portion 51d, is attached in a non-separable manner to the bag holder 31. That is, the insulator 51 is integrated with the bag holder 31.

As shown in FIGS. 4 and 10, the flange 32c and each fastener F are electrically connected to the metal core 22 by a connector 57 including a tab 52, a ground wire 53, a fixture 55, and a bolt 56.

In detail, the tab 52 is formed by a conductive metal plate including an insertion hole 52a. In a state in which an insertion hole 52a of the tab 52 is aligned with a corresponding insertion hole 32d in the flange 32c of the inflator 32, the tab 52 is located between the flange 32c and the corresponding nut 36. The bolt 35 inserted through the corresponding insertion hole 32d of the flange 32c is also inserted through the insertion hole 52a of the tab 52. The nut 36 is tightened to the bolt 35 to press the tab 52 against the flange 32c.

The fixture 55 is formed from a conductive metal material and located on the metal core 22 at a position proximate to the tab 52. The bolt 56 couples the fixture 55 to the metal core 22. The ground wire 53 connects the tab 52 and the fixture 55.

The operation of the present embodiment under different situations will now be described together with the advantages of the present embodiment.

During Manufacturing

The insulator 51, to which the bag holder 31 is attached, is formed in the steering wheel 15 through insert molding. More specifically, the hag holder 31, which is prepared in advance, is arranged as an insert in the mold. A cavity in the mold is charged with molten resin around the portion of the hag holder 31 surrounding the opening 31b. The charged molten resin is hardened to form the insulator 51 around the portion surrounding the opening 31b.

The insulator 51, which is formed in this manner, is attached to the bag holder 31 by the second insulation portions 51b and the fourth insulation portion 51d that connect the first insulation portion 51a and the third insulation portion 51c. When the bag holder 31 and the insulator 51 are separately formed, the insulator 51 would have to be subsequently coupled to the bag holder 31. However, in the present embodiment, the insulator 51 is attached to the bag holder 31 when formed. Hence, there is no need to couple the insulator 51, and manufacturing is facilitated.

During Normal Use (Non-Collision State)

Referring to FIG. 3, under a normal situation, gas is not ejected into the airbag device 30 from the gas ejection holes 32b of the inflator 32. Gas is generated when a frontal collision applies impact to the automobile 10 from the front. In the normal situation, the airbag 33 remains folded.

The conductive bag holder 31, which forms part of the positive electric path. 38, is insulated by the insulator 51 from at least the flange 32c of the inflator 32 and the fasteners F among the elements of the airbag device 30.

More specifically, referring to FIG. 10, the first insulation portion 51a, which is located between the bag holder 31 and the flange 32c, insulate the bag holder 31 from the flange 32c. Further, the second insulation portions 51b, which are located between the bolts 35 and the wall surfaces of the insertion holes 31c in the bag holder 31, insulate the bag holder 31 from the bolts 35. In this manner, the insulator 51 insulates the bag holder 31 from the flange 32c and the fasteners F. In other words, the inflator 32 and the fasteners F are electrically isolated from the bag holder 31.

Further, the third insulation portion 51c, which is located between the bag holder 31 and the portion of the airbag 33 surrounding the opening 33a, insulates the bag holder 31 from the ring retainer 34.

Referring to FIGS. 4 and 10, the flange 32c and the fasteners F are electrically connected by the connector 57 to the metal core 22, which is earthed to the body of the automobile 10.

When static electricity is generated due to rubbing of the airbag 33 or the like, the static electricity is released to the body of the automobile 10 via the flange 32c of the inflator 32, the fasteners the tab 52, the ground wire 53, the fixture 55 (the bolt 56), and the metal core 22. In this manner, static electricity is released from the inflator 32 without the inflator 32 being connected to the bag holder 31, which forms part of the positive electric path 38. As a result, the present embodiment reduces the static electricity accumulated in the inflator 32 like in the prior art.

During Non-Downwardly Pressed. State of Airbag Device 30

Referring to FIGS. 4 and 5, in the normal situation, when the airbag 30 downwardly pressed, the rearward urging force of the coil spring 48 is transmitted by the collar 44b to the pin holder 44. The pin holder 44, which is urged toward the rear, is in contact with the flange 41d of the snap pin 41, which is engaged with the metal core 22 by the clip 23. This restricts further rearward movement of the pin holder 44.

The urging force is transmitted by the damper holder 45 to the bag holder 31 and the contact holder 42. The urging force transmitted to the contact holder 42 is further transmitted to the switch supports 18d. Urging force is transmitted in this manner so that the airbag device 30 is moved away toward the rear from the metal core 22.

Consequently, the movable contact 43, which is coupled to the contact holder 42, is also urged toward the rear, and the contact projections 43c are moved away toward the rear from the fixed contact 41e, which is located on the rear end of the snap pin 41. In this state, the movable contact 43 is disconnected from the snap pin 41, and the horn device 24 is deactivated.

In the normal situation, when vibration is transmitted to the steering wheel 15 in the up-down direction or the lateral direction while the automobile 10 is travelling at a high speed or the automobile engine is idle, the vibration is transmitted via the metal core 22 and the horn switch mechanisms 40 to the airbag device 30. More specifically, the vibration is transmitted via the snap pin 41, the pin holder 44, the elastic member 46, and the damper holder 45 to the contact holder 42 and the bag holder 31.

When vibration is transmitted as described above, the airbag device 30 functions as a mass damper of a dynamic damper in accordance with the vibration. Further, as the elastic member 46 elastically deforms at the resonance frequency that is close to or the same as the target vibration frequency of the steering wheel 15, the elastic member 46 vibrates (resonates) together with the airbag device 30 in the up-down direction and the lateral direction and function as a spring of the dynamic damper. The resonance absorbs the vibration energy of the steering wheel 15 and reduces vibration in the up-down direction and lateral direction of the steering wheel 15.

Airbag Device 30 in Downwardly Pressed State

In the normal situation, when the airbag device 30 is downwardly pressed to activate the horn device 24, the force applied to the airbag device 30 is transmitted by the contact holder 42 of at least one of the horn switch mechanisms 40 to the movable contact 43 and the damper holder 45. The force pushes and moves the damper holder 45 toward the front. The movement of the damper holder 45 is transmitted by the collar 44b to the pin holder 44. The transmission of force slides the pin holder 44 along the shank 41a of the snap pin 41 against the coil spring 48. Further, the movable contact 43 moves toward the front together with the contact holder 42.

Figure 11:
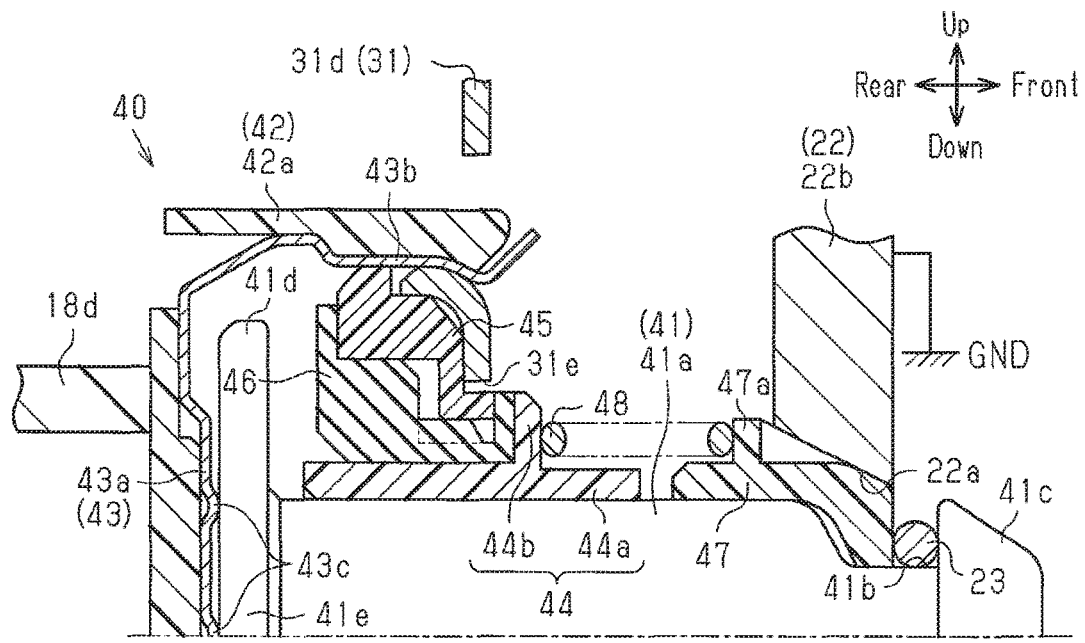
FIG. 11 is a cross-sectional view of the horn switch mechanism when the airbag device is downwardly pressed from the state of FIG. 5.

Then, as shown in FIG. 11, when at least one of the contact projections 43c of the movable contact 43 comes into contact with the fixed contact 41e of the snap pin 41, the metal core 22, which is earthed to the body of the automobile 10, and the bag holder 31 are electrically connected by the clip 23, the snap pin 41, and the movable contact 43. This closes the corresponding horn switch mechanisms 40 and activates the horn device 24, which is electrically connected to the bag holder 31.

Airbag Device 30 in Activated State

When impact is applied to the automobile 10 from the front by a frontal collision or the like, inertia acts to force the driver D toward the front. In such a case, the airbag device 30 shown in FIG. 3 actuates the inflator 32 in accordance with the impact and ejects gas from the gas ejection holes 32b. The gas is supplied to the airbag 33 to unfold (deploy) and inflate the airbag 33. The airbag 33 increases the pressure that the pad 18 applies to the cover 18a. This tears the thin portion 18c of the cover 18a and forms an opening in the cover 18a. The airbag 33 is continuously deployed and inflated through the opening. In this manner, the airbag 33 is deployed and inflated in front of the driver D who is forced toward the front by the impact of the frontal collision. This protects the driver D from the impact.

If the first insulation portion 51a shown in FIG. 10 were to be arranged only around the insertion holes 31c of the bag holder 31, there would be locations between the bag holder 31 and the flange 32c where the first insulation portion 51a is not arranged around the case 32a of the inflator 32. Gaps would be formed at such locations between the bag holder 31 and the flange 32c. Thus, some of the gas from the inflator 32 may leak out of the airbag 33 through the gap.

In the present embodiment, as shown in FIGS. 6 and 7, the first insulation portion 51a is arranged on the looped portion of the bag holder 31, which is where the flange 32c is pressed against. Thus, the case 32a of the inflator 32 is surrounded by the first insulation portion 51a between the bag holder 31 and the flange 32c. The formation of a gap is limited around the case 32a between the bag holder 31 and the flange 32c. Accordingly, gas leakage from the airbag 33 is limited.

If the third insulation portion 51c shown in FIG. 10 were to be arranged only around the insertion holes 31c of the bag holder 31, the portion of the airbag 33 surrounding the opening 33a would be coupled to the bag holder 31 only at locations contacting the third insulation portion 51c (only at portions around insertion holes 31c). Locations around the portion surrounding the opening 33a distant from the insertion holes 31c would not be pressed by the retaining portion 34a of the ring retainer 34 and would not be coupled to the bag holder 31. Thus, when the airbag 33 is deployed and inflated toward the rear, stress will be concentrated and applied to the location where the portion of the bag holder 31 surrounding the opening 33a is coupled (portions around insertion holes 31c).

In the present embodiment, as shown in FIGS. 8 and 9, the third insulation portion 51c is arranged on the looped portion of the bag holder 31, which is where the retaining portion 34a is pressed against the portion surrounding the opening 33a. This increases the area of the portion surrounding the opening 33a that contacts the third insulation portion 51c. The entire portion surrounding the opening 33a is pressed against the third insulation portion 51c and coupled to the bag holder 31. Thus, the rearward deployment and inflation of the airbag 33 applies stress in a dispersed state to the portion surrounding the opening 33a. This limits the application of stress to the portion surrounding the opening 33a that becomes excessive at certain locations.

It should be apparent to those skilled in the art that the present invention may be embodied in many other specific forms without departing from the spirit or scope of the invention. Particularly, it should be understood that the present invention may be embodied in the following forms.

Figure 12:
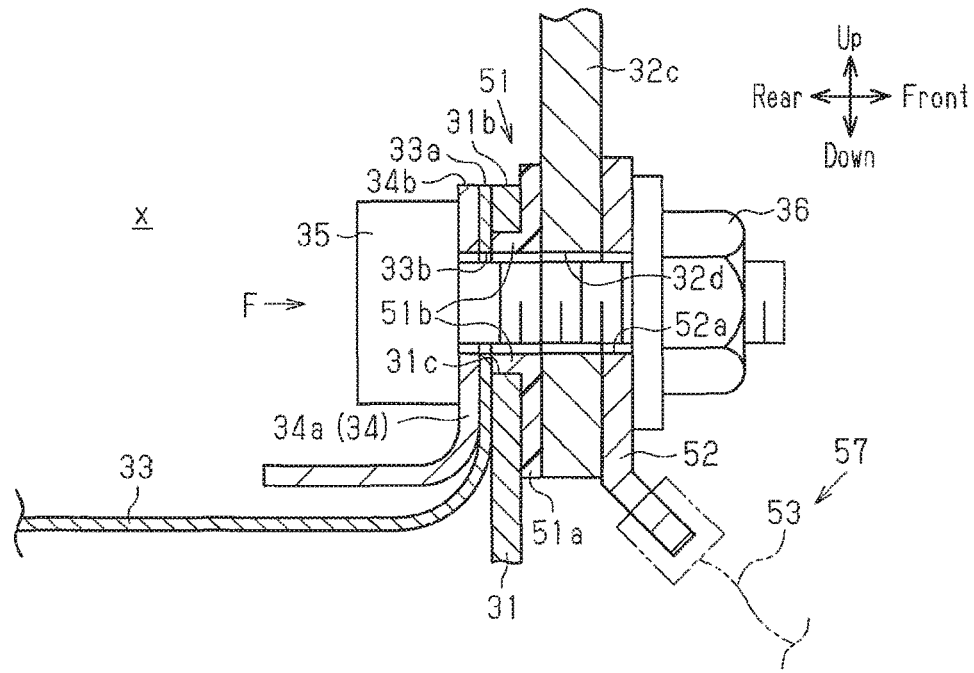
FIG. 12 is a cross-sectional view corresponding to FIG. 10 showing a state in which an insulator of a modified example is insulating the bag holder from the flange and the fastener.
Figure 13:
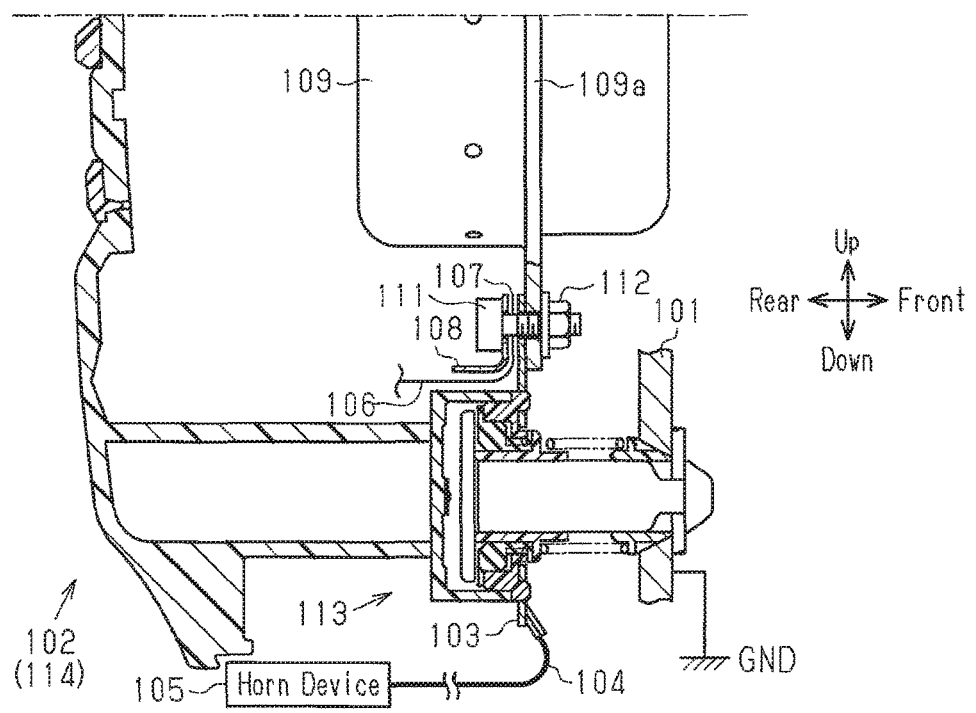
FIG. 13 is a cross-sectional view showing part of a conventional steering wheel.

As shown in FIG. 12, the insulator 51 may include only the first insulation portion 51a and the second insulation portions 51b. This also allows the bag holder 31 to be insulated from at least the flange 32c and the fasteners F among the elements of the airbag device 30.

In this case, after separately forming the bag holder 31 and the insulator 51, the insulator 51 can be coupled to the bag holder 31. The insulator 51 does not have to be insert-molded using the bag holder 31 as an insert.

The first insulation portion 51a may be arranged on the bag holder 31 at a location that is wider than the looped portion to where the flange 32c as pressed against.

The third insulation portion 51c may be arranged on the bag holder 31 at a location that is wider than the looped portion to where the portion of the airbag 33 surrounding the opening 33a is pressed against by the retaining portion 34a of the ring retainer 34.

The tab 52 of the connector 57 may be located between the first insulation portion 51a of the insulator 51 and the flange 32c.

Among the flange 32c and the fasteners F, just the flange 32c may be electrically connected by the connector 57 to the metal core 22. For example, a washer, a spacer, or the like formed from a non-conductive material may be located between the tab 52 and the nuts 36.

In addition to an automobile, the steering wheel may be applied to the steering device of any vehicle such as an aircraft or a watercraft.

The present examples and embodiments are to be considered as illustrative and not restrictive, and the invention is not to be limited to the details given herein, but may be modified within the scope and equivalence of the appended claims.

The invention claimed is:

1. A steering wheel comprising:
a metal core earthed to a body of a vehicle;
an airbag device including
a bag holder supported by the metal core, wherein the bag holder forms part of a positive electric path connected to a horn device,
an airbag coupled to the bag holder by a fastener, and
an inflator including a circumferential portion that forms a flange, wherein the flange of the inflator is coupled by the fastener to the bag holder;

an insulator that insulates the bag holder from at least the flange and the fastener among elements of the airbag device; and a connector that electrically connects at least the flange, among the flange and the fastener, to the metal core.

2. The steering wheel according to claim 1, wherein:

a portion of the airbag surrounding an opening, the bag holder, and the flange each include an insertion hole;

the fastener includes a bolt inserted through the insertion hole of each of the airbag, the bag holder, and the flange; and the insulator includes a first insulation portion located between the bag holder and the flange and a second insulation portion located between the bolt and a wall surface of the insertion hole in the bag holder.

3. The steering wheel according to claim 2, further comprising a ring retainer located in the airbag at a side opposite to the flange relative to the bag holder, wherein the fastener presses the ring retainer toward the bag holder to couple the portion of the airbag surrounding the opening to the bag holder, and the insulator further includes a third insulation portion located between the bag holder and the portion of the airbag surrounding the opening.

4. The steering wheel according to claim 3, wherein the first insulation portion, the second insulation portion, and the third insulation portion are formed integrally from the same resin material.

5. The steering wheel according to claim 3, wherein:

the ring retainer includes a looped retaining portion that presses the portion of the airbag surrounding the opening toward the bag holder;

the bag holder includes a looped portion;

the portion of the airbag surrounding the opening is pressed toward the looped portion of the bag holder by the retaining portion; and the third insulation portion is arranged on the bag holder at a location including at least the looped portion.

6. The steering wheel according to claim 2, wherein:

the bag holder includes a looped portion;

the flange is pressed toward the looped portion of the bag holder; and the first insulation portion is arranged on the bag holder at a location including at least the looped portion.

* * * * *